UNITED STATES PATENT OFFICE.

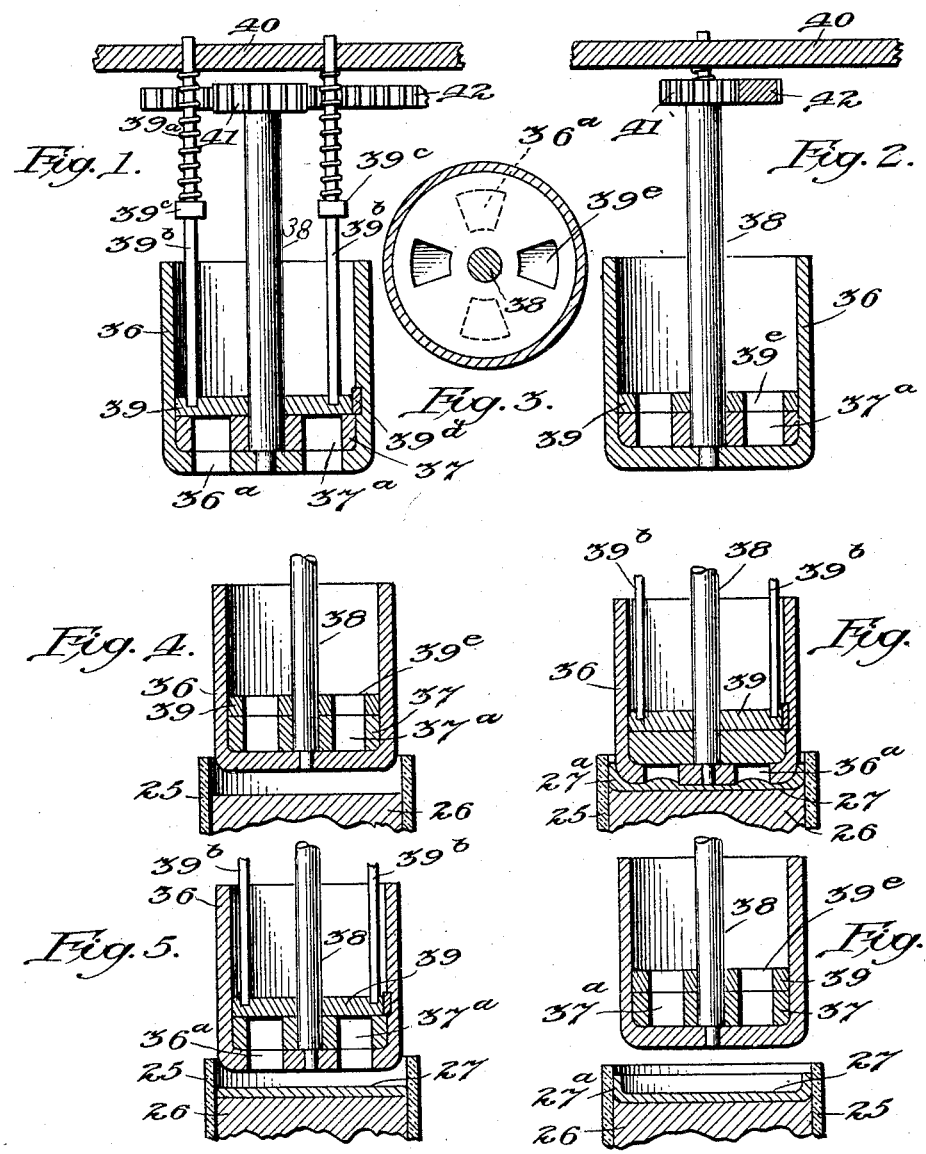

FRANK GRAEBER, OF PHILADELPHIA, PENNSYLVANIA, ASSIGNOR TO HERMAN HOWARD HARTING, OF PHILADELPHIA, PENNSYLVANIA.

PACKAGED ARTICLE AND METHOD FOR PRODUCING THE SAME.

1,114,748.   Specification of Letters Patent.   Patented Oct. 27, 1914.

Original application filed April 26, 1913, Serial No. 763,815. Divided and this application filed October 14, 1913. Serial No. 795,104.

*To all whom it may concern:*

Be it known that I, FRANK GRAEBER, a citizen of the United States, residing at Philadelphia, in the county of Philadelphia and State of Pennsylvania, have invented new and useful Improvements in Packaged Articles and Methods for Producing the Same, of which the following is a specification.

My invention relates to packaging food products and more particularly to the providing of packages of this type with a paraffin coating, the present application being drawn to the packaged article and the method for producing the same, being a division of the application filed by me April 26, 1913, Serial No. 763,815.

In packaging food products, such as jellies, etc., the container is generally in the form of a glass tumbler, and after the jelly is placed therein, a coating of paraffin is applied to the exposed surface of the jelly. This coating has generally been in the form of a relatively flat layer of paraffin of substantially equal thickness throughout the coating, the result being that either a relatively thick layer must be employed in order to provide the periphery of the coating with a surface of sufficient extent to provide the proper adhesion to the glass, or where the layer has been comparatively thin, such peripheral contact has been insufficient to provide the proper excluding qualities as well as adhesion to the glass.

The present invention contemplates the forming of a comparatively thin layer with a peripheral surface adapted to contact with the glass, said contacting surface being of greater length lengthwise of the glass than the thickness of the layer, this being provided by displacing the paraffin while in its liquid state so as to decrease the thickness of the initial layer, the displaced material being forced along the glass surface so as to cause it to extend above the top plane of the main portion of the layer, providing the appearance somewhat of a dish shaped coating, the lower surface of the layer, however, extending throughout the area of the exposed face of the jelly, the result being that without increasing the amount of paraffin required, a coating of sufficient thickness for the desired purpose is provided, and at the same time a maximum peripheral surface in contact with the glass is produced.

Among the objects of my invention, therefore, are to be found the production of a food product package having a paraffin coating of the characteristics above indicated, and the provision of a method for producing such package.

To these and other ends, the nature of which will be readily understood as the invention is hereinafter disclosed, my invention consists in the improved package and the method by means of which it may be provided, all as hereinafter fully described, illustrated in the accompanying drawings, and more particularly pointed out in the appended claims.

In the accompanying drawings, in which similar reference characters indicate similar parts in each of the views, Figures 1 and 2 are vertical sections of a valve structure forming part of an apparatus which may be employed in carrying out my improved method and forming the package produced thereby, said structures being disclosed in connection with operating mechanism in the parent application. Fig. 3 is a horizontal sectional view of one of the valve containing cups. Figs. 4 to 7, inclusive, are views, somewhat diagrammatic, illustrating the method in which the coating is produced, the valve structures of Figs. 1, 2 and 3 being used in connection therewith. Fig. 8 is a detail view showing a simple way in which my method may be carried out.

The package with its paraffin coating formed in accordance with my present invention is shown, somewhat diagrammatically, at the bottom of Fig. 7, the glass or container being indicated at 25, the food products at 26, and the coating at 27, the coating being shown as in the form of a comparatively thin layer with a flange 27$^a$ projecting upwardly peripherally of the layer and in contact with the inner face of the glass, thus making an extended peripheral contact with the glass, and at the same time providing a relatively thin layer of sufficient thickness, however, to provide the desired excluding qualities. It is to be understood, however, that the present invention is not limited to a thin layer, nor to the amount of projection of the flange 27$^a$ to provide the peripheral contact, these necessarily varying according to the particular food products being packaged as well as to meet the desires of the user, the main feature being that the thickness of the layer be increased peripherally at its point of contact with the glass and lengthwise of the glass, it being preferred that the increase be on the side of the layer opposite that of the food products. The method by which this result is obtained is shown diagrammatically in Figs. 4 to 7, consisting in forming a layer of liquid paraffin on the top of the food products within the glass, preferably in measured quantity, and then placing a suitable plunger of less diameter than the diameter of the glass on the top surface of this layer, while still in liquid state, and applying pressure to the plunger, thereby forcing out air bubbles, etc., which may be exposed on the top of the food products and at the same time displacing a portion of the paraffin so that it will pass between the sides of the plunger and the glass, the plunger being retained in position sufficiently long to permit the paraffin to set, after which the plunger is withdrawn. A simple form for producing this result is shown in Fig. 8, in which the plunger is indicated at 28. As a result, the layer is expanded along its periphery and provides a relatively wide surface contact with the glass and thus produces a maximum excluding effect.

The specific apparatus by means of which the method is preferably provided is more particularly set forth in my prior application above identified. However, I have included herein a showing of a portion of such apparatus, this showing being that of one of the elements which are employed for the purpose of delivering a predetermined amount of liquid paraffin to the food products container, the structure being adapted to act as the plunger by means of which the pressure is placed upon the paraffin coating after the latter has been deposited. The structure referred to comprises a cup-shaped receptacle, indicated at 36, which is secured within the bottom of a tank containing liquid paraffin, the bottom of the cup being provided with one or more openings $36^a$ (I prefer to employ two openings), these openings being spaced apart and forming the discharge openings for the paraffin.

37 designates a valve member which is carried by a stem 38, the latter being suitably mounted for rotation or oscillation, said stem extending through a cut-off plate 39 mounted within the cup above the valve and preferably held against rotation by suitable means such as a spline $39^a$. I preferably render the plate 39 yieldable slightly, and for this purpose I may employ rods $39^b$ carrying a collar $39^c$ between which and a bar 40 is mounted a spring $39^d$; I preferably employ two of these structures approximately diametrically opposed with respect to the plate. The plate 39 is preferably provided with one or more openings $39^e$, (the number corresponding to the number of openings $36^a$), the openings $39^e$ being positioned out of vertical alinement with the openings $36^a$, a preferable arrangement being shown in Fig. 3, in which the openings $36^a$ are shown in dotted lines. The valve 37 is also provided with a similar number of openings $37^a$ and in the operation of the apparatus, the valve is positioned to have its openings $37^a$ in alinement with the openings $39^e$ when the apparatus is at rest, the valve in this position, being adapted to receive the paraffin, the latter filling the openings $37^a$ as well as the openings $39^e$.

As will be readily understood, a movement of the valve in a rotary direction will carry its openings out of alinement with the openings $39^e$ and into alinement with the openings $36^a$, the movements of the valve between these positions providing for the segregating of the proper amount of paraffin for use in providing the coating for a single container, the valve receiving the paraffin through the openings $39^e$ and discharging it through the openings $36^a$. As will be understood, the movement of the valve in passing from its receiving to its discharging position will act to cut off the supply when the openings $37^a$ have passed out of alinement with the openings $39^e$.

As will be obvious, the size of the openings $37^a$, will determine the amount of paraffin discharged, the normal amount being about a spoonful.

The stem 38 may be rotated in any desired manner the structure shown being that of a pinion 41 carried by the stem 38, this pinion being operatively connected to a rack 42, the rack being adapted to be given intermittent back and forth motions through mechanism not specifically disclosed herein but forming a part of the general apparatus.

It will be understood that a suitable support for the food products container will be provided beneath the cups 36 or the plunger 28, as the case may be, or if desired, the container may be manually supported.

The operation of the method will be understood from the preceding description, but in connection with the specific valve structures shown, the following additional statement of operation is given. It being assumed that the tank to which the cup 36 is attached is provided with paraffin in a liquid state and which paraffin extends into the cup 36, and it also being assumed that a container is positioned below the cup, and that the valve 37 is in the position shown in Fig. 4, a position which brings the openings $37^a$ into alinement with the openings $39^e$, a movement of the rack 42 in one direction causes the valve 37 to be moved so as to bring the openings $37^a$ into alinement with the openings $36^a$, thus permitting the measured paraffin to drop on the exposed surface of the food products which may be within the container, the liquid forming a layer thereon. A return movement of the rack 42 is then had which closes the alinement between openings 37ª and 36ª and restores that between the openings 37ª and 39ᵉ, thus opening up communication between the tank and the valve 37 and closing the discharge from the cup.

When the paraffin has been deposited, a movement of the container toward the cup will bring the upper surface of the paraffin layer into contact with the bottom of the cup and as the cup is of less diameter than the diameter of the glass or container, it will be readily understood that a further movement of the container toward the cup will cause pressure to be applied on the paraffin layer to displace a portion thereof and cause it to pass around the side wall of the cup adjacent the cup bottom, the slight amount of paraffin which may pass within the openings 36ª being negligible. This displacement acts to provide the flange and at the same time causes the air bubbles to to be broken, and the air expelled around the side of the glass, this latter being more clearly apparent from the fact that it is to be understood that the cups being in contact with heated paraffin will in themselves have sufficient heat to retain the paraffin against hardening a length of time sufficient to permit of this action with respect to the discharge of air bubbles and the formation of the flange and its contact with the walls of the glass.

While I have shown and described a method for producing the package referred to, it will be readily understood that changes and modifications therein may be required or desired to meet the exigencies of use and I desire to be understood as reserving the right to make such changes and modifications as may be necessary or desirable in this connection in so far as the same may fall within the spirit and scope of the invention as expressed in the accompanying claims. Also, in the use of terms throughout the specification and claims I contemplate all equivalents in meaning and in parts or materials. For instance, the term paraffin typifies and includes all sealing materials which may be used in a similar manner.

Having thus described my invention, what I claim as new is:

1. In a food-products package, a container for the food product, and a sealing coating for the food product, said coating being formed in place from molten sealing material and in the form of a layer dish-shaped in cross section with an upturned peripheral flange adhering to the wall of said container.

2. A food-products package comprising a container for the food product, and a sealing coating formed in place from molten sealing material above the upper surface of the food product and with an upturned peripheral flange in adhering sealing engagement with the wall of said container.

3. A food-products package comprising a container for the food product, and a substantially flat sealing coating formed in place from molten sealing material upon the upper surface of the food product and with an upturned peripheral flange of substantially uniform thickness in adhering sealing engagement with the wall of said container.

4. A food-products package comprising a container for the food product, and a sealing coating formed in place from molten sealing material to provide a substantially flat uniform layer over the food product and an upturned peripheral flange substantially the thickness of said layer in adhering sealing engagement with the wall of said container.

5. A food-products package comprising a sealing coating formed in place from molten sealing material and with a substantially flat covering portion and an upturned peripheral flange.

6. The method of applying coating to food-product packages which consists in forming a layer of liquid sealing material on the surface of the product, and then displacing the layer to form a laterally-extending flange at the periphery of the layer, the inner wall of the food-product container forming a mold wall for the flange.

7. The method of applying a paraffin coating to food-product packages which consists in forming a layer of liquid sealing material on the surface of the product, and then applying pressure to the exposed face of the layer to partially displace it peripherally to form a laterally projecting flange, the product container forming a mold wall for the flange during the displacing operation.

In testimony whereof I have hereunto set my hand in presence of two subscribing witnesses.

FRANK GRAEBER.

Witnesses:
JOHN W. ARMSTRONG,
W. J. ARMSTRONG.

Copies of this patent may be obtained for five cents each, by addressing the "Commissioner of Patents, Washington, D. C."